Feb. 19, 1957
B. F. W. HEYER ET AL
2,782,357
6-12 VOLT BATTERY TESTER
Filed Aug. 13, 1953
4 Sheets-Sheet 1
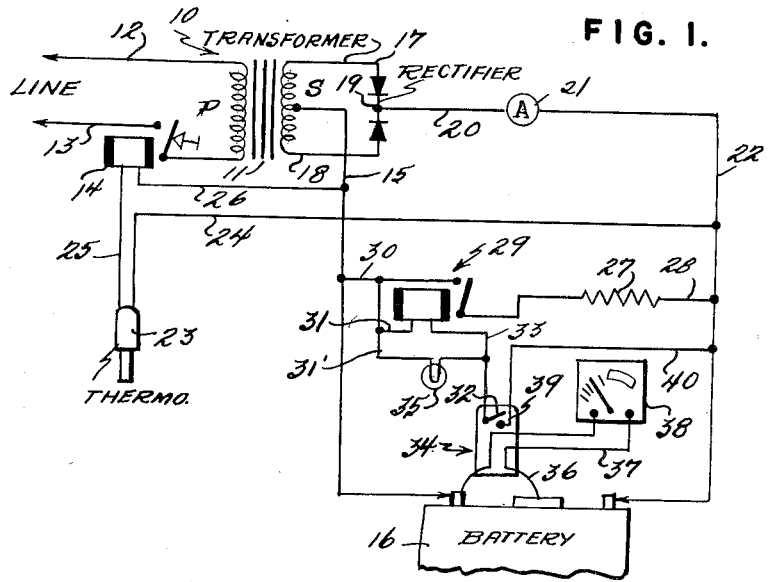
FIG. 1.
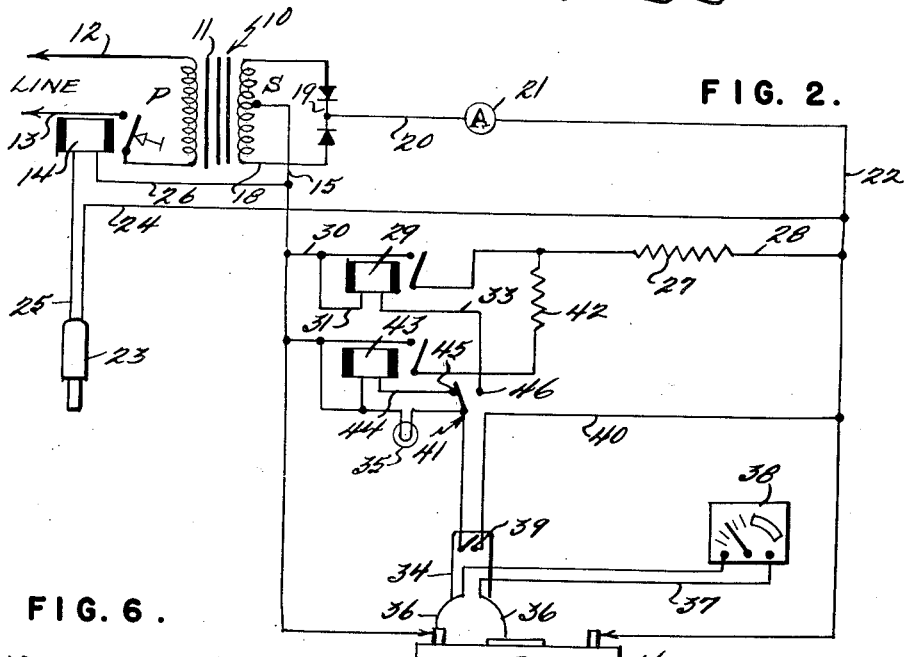
FIG. 2.
FIG. 6.
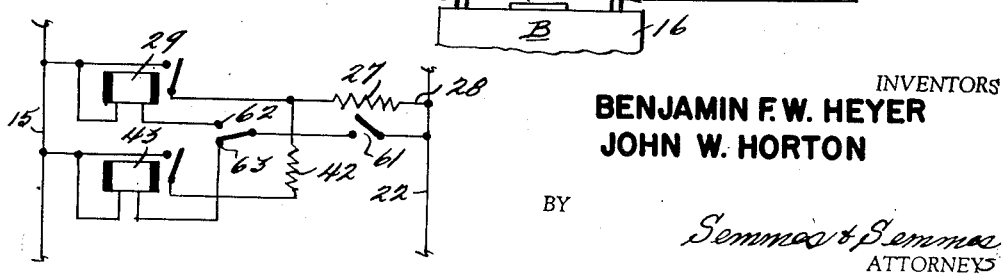
INVENTORS
**BENJAMIN F. W. HEYER
JOHN W. HORTON**
BY
*Semmes & Semmes*
ATTORNEYS

INVENTORS
**BENJAMIN F. W. HEYER
JOHN W. HORTON**

BY

*Semmes & Semmes*
ATTORNEYS

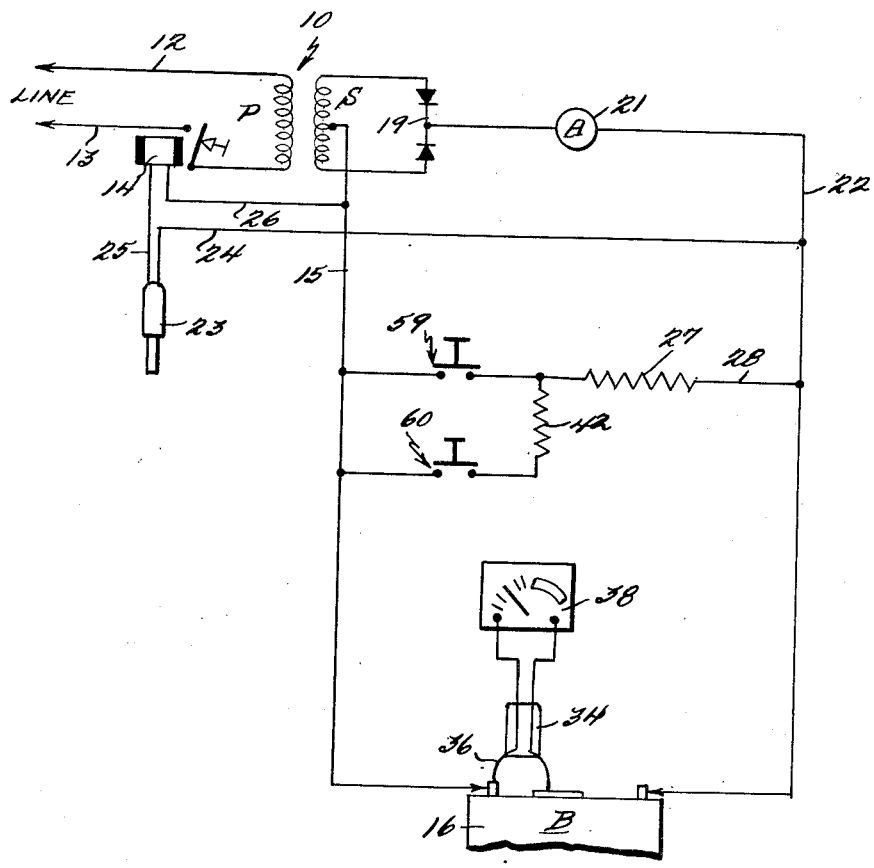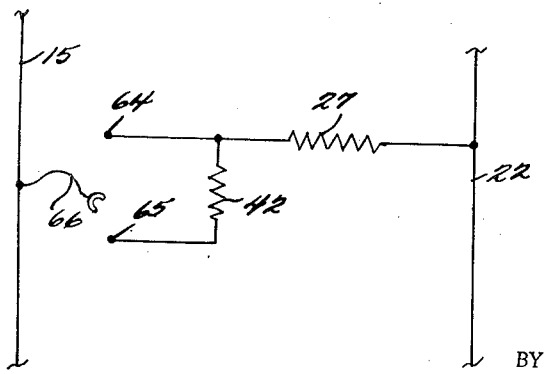

INVENTORS
**BENJAMIN F. W. HEYER
JOHN W. HORTON**

BY

*Semmes & Semmes*
ATTORNEYS

United States Patent Office 2,782,357
Patented Feb. 19, 1957

2,782,357
6-12 VOLT BATTERY TESTER

Benjamin F. W. Heyer, Greenwich, Conn., and John W. Horton, Inglewood, Calif.

Application August 13, 1953, Serial No. 373,974

12 Claims. (Cl. 320—14)

The present invention relates in general to electrical measuring instruments and more particularly relates to apparatus for testing storage batteries to determine their condition.

As is known, many devices have heretofore been used to ascertain the condition of storage battery cells such as determining voltage drop across a cell, while a load serving to establish a normal discharge rate on the battery is being impressed on the cells.

In recent times, there have been utilized so-called "fast charge" methods of charging automobile storage batteries and the like. Such methods and apparatus have an inherent disadvantage in that a high current is utilized and a damage of the battery might easily occur when the temperature of the battery has reached a value in excess of that which would normally be attained when the battery has received a full charge.

Additionally, in recent times, there has been an increasing tendency to utilize higher voltage systems and batteries in automobiles than those previously in common use. Six volt batteries have been generally accepted as standard equipment up until recent times, but now there is a definite trend toward use of 12 volt batteries. This change has resulted in rendering many battery charging and testing units obsolete, since they cannot be utilized for both types as a general rule.

Additionally, the known method of testing 6 volt batteries by determining the entire overall condition of the battery is not satisfactory with 12 volt batteries which, in order to obtain a positive and accurate indication of battery condition, must utilize an individual cell test while the battery as a whole is subjected to a load commensurate with a starting discharge or draw on the battery.

This has necessitated expensive replacement and duplication of testing and battery charging equipment. It has also raised problems with regard to the measuring instruments per se since a dual range and means of adjustment must be provided to adapt them for use in testing both types of batteries.

It is accordingly an object of the present invention to provide a battery tester which overcomes the failures and drawbacks of previously known units.

Another object of the present invention is to provide, in a battery tester, means for controlling the rate of charge and providing control means actuated by the electrolyte temperature of the battery to discontinue charging, when the temperature has reached a predetermined range where damage to the battery, if charging is continued, would occur. In accordance with the teachings of this invention, a thermostat is used to terminate the charge at a preselected temperature which insures a full charge and a specific temperature, thereby insuring that testing will be accurate.

Another object of the present invention is to provide, in a battery tester, means for making a voltage connection across individual cells and including a switch which will energize a relay in series with a resistor to apply a load across the battery terminals.

A further object of the present invention is to provide a battery tester which has means for adjusting the load circuit to adapt the tester for use with 6 volt or 12 volt batteries.

A still further object of the present invention is to provide an adjustable circuit as set forth above in which means are provided for automatic sensing of battery voltage, and automatic switching to the desired load to be applied to the battery.

An additional object of the present invention is to provide, in a battery tester, means for indicating when a load is applied to the battery during testing.

A still further object of the present invention is to provide a battery tester having a voltmeter to read cell voltage under load, and in which means are provided for adjusting the tester to different size batteries. Such means can be by effecting an adjustment of the zero reading of the meter; by placing an adjustable rheostat in series in the circuit to require greater voltage, and accordingly to give the same deflection of a needle within a range; and by varying the test load.

A further object of the present invention is to provide a battery tester utilizing a selective load resistor and a voltage sensitive relay system for controlling the load resistor which responds to overall voltage of the battery to select the proper load.

A still further and important object of the present invention is to provide a battery tester having means for automatically disconnecting the voltage sensitive relay and load circuit while the battery is undergoing charging.

A further object of the present invention is to provide, in a battery tester, a selective load resistor where the value of a resistance used for a 6 volt battery is different from that of a 12 volt battery, and a plurality of selective switches are provided for manual or automatic operation, to connect the loads as required for accurate testing of the cell voltage.

Another object of the present invention is to provide a battery tester incorporating a holding contactor assembly, adapted for manual operation, to turn the unit on or off, and additionally being controllable by a thermostat operated on electrolyte temperature to automatically turn the unit off when a required charge has been placed in the battery. Manual operation of the holding contactor assembly is then required to reactivate the unit.

The present invention consists mainly in circuits incorporating the various features and individual elements required for proper testing of a battery. The individual components and elements utilized in the various circuits manifestly could be varied in small details by a person skilled in the art to which the present invention pertains. Some of the individual elements set forth in combination in the circuits have previously been the subjects of patents as will more fully appear hereinafter.

The present invention provides a battery tester of simplicity and relatively inexpensive cost, while at the same time providing highly efficient and safe results. While the hereinafter described embodiments of the invention relate specifically to the testing of electrical storage batteries, it is to be understood that the invention is not limited thereto and can manifestly be employed in other fields requiring the testing of a characteristic of materials and devices or units which are subject to a variation in performance dependent on said characteristics.

Further objects and advantages of the present invention will be readily apparent from the following detailed description of embodiments of the invention, which are illustrative only, when taken together with the accompanying drawings in which:

Figure 1 is a schematic view of the circuit of a battery tester embodying the concepts of the present invention;

Figure 2 is a view similar to Figure 1 illustrating a modified form of circuit with a selective battery load circuit manually operable;

Figure 5 is a view similar to Figure 2 illustrating a further modified form of circuit in which manual selective load means are utilized and utilizing a separate meter circuit;

Figure 6 is a portion of a further modification of a circuit utilizing push-button selector means with a plurality of relays for actuation of the battery load;

Figure 7 is a portion of a further modified circuit utilizing jumper means for control of the load on the battery;

Figure 4:
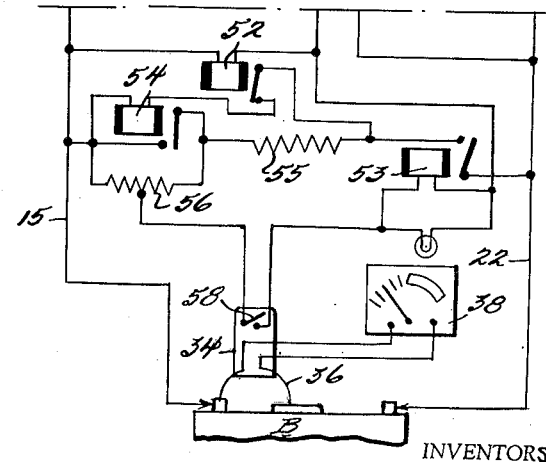
Figure 4 is a view similar to Figure 1 illustrating a still further modified form of circuit in which means are provided for automatically and selectively eliminating either a charging circuit or a tester circuit when one or the other is in operation and in which a combination prod operating a meter circuit and a load circuit is utilized.
Figure 8:
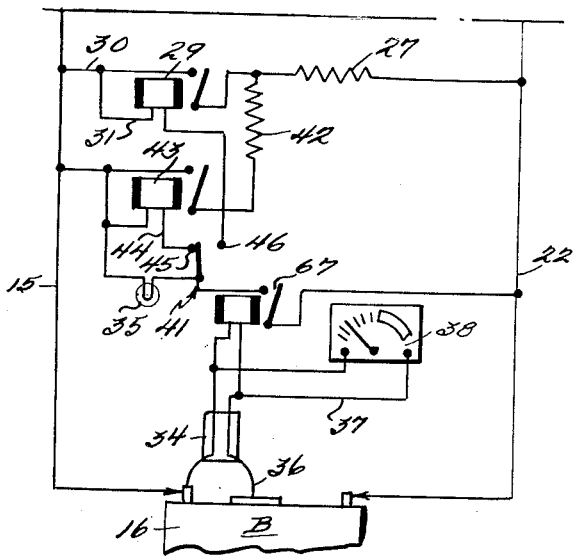
Figure 9:
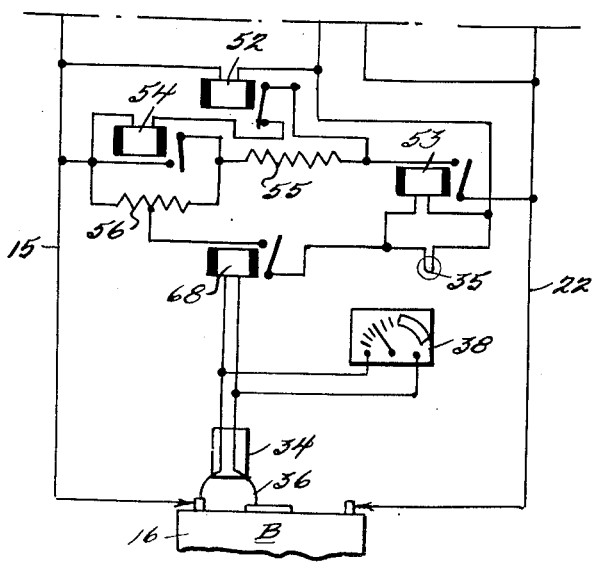

Figure 8 is a view similar to Figure 2 but utilizing a relay connection across the prod to close the load circuits, and the actuating voltage is derived from the cell under test; and Figure 9 is a view similar to Figure 4 of a further modified circuit but wherein the actuating voltage for the relays controlling application of the test load on the battery actuates an additional relay for controlling the operation of the testing device.

In the various figures of the drawings, like reference numerals apply to like parts.

In Figure 1 of the drawings, there is shown a transformer 10 having a primary winding P and a second winding S and a magnetic core shown at 11. The transformer 10 serves the usual purpose of reducing voltage from an A. C. source to the battery to be charged. A conductor 12 leads from one end of the primary winding and a conductor 13 leads from the other end of the primary winding P. The conductor 12 extends to an A. C. power source. Conductor 13 is connected to the terminals of a holding contactor assembly generally shown at 14 and then extends for connection into the A. C. power source. The purpose of the holding contactor assembly will appear hereinafter.

The secondary winding S of transformer 10 is tapped at a point intermediate the ends thereof and a conductor 15 leads from this tapping point and is connected by means of a battery terminal clip to a battery shown at 16. The secondary winding S of the transformer 10 has its terminals connected by conductors 17 and 18 to the terminals of a full-wave rectifier 19. The rectifier is connected by conductor 20 to an ammeter 21 and from the ammeter there extends a conductor 22 which is connected by a suitable battery terminal clip to another terminal of the battery 16 to be charged and/or tested.

A thermostat 23 adapted for insertion in the electrolyte of the battery to be charged is connected to conductor 22 by means of a conductor 24 and a conductor 25 from the other terminal thereof to one terminal of the holding contactor assembly 14. From another terminal of the holding contactor 14 there extends a conductor 26 which is connected into conductor 15. The thermostat 23 is of a type shown in Reissue Patent No. 22,883. The purpose of this thermostat is to prevent overheating of the batteries due to the high current passing therethrough in "fast chargers." This thermostat is highly sensitive to temperature changes in the battery electrolyte fluid and enables the maximum charge to be introduced into the battery without exceeding predetermined temperature limits. The thermostat incorporates a switch actuated by the thermostat and enclosed within the housing. When a predetermined temperature has been reached, a switch will be actuated by a movable member of the thermostat so as to break the circuit and discontinue charging of the battery. The details of this thermostat are set forth in the aforementioned patent.

The holding contactor assembly 14 consists in a solenoid and core mounted therein. The core mounts an actuating rod which is spring-pressed and biased to outward or extended position. This rod is adapted, upon being moved to innermost position, to close contacts and in this instance, the contacts would be secured to the terminals attached to conductor 13. The spring, however, biases the rod to outer position and it will only remain in its inner position maintaining the contacts in electrical contact when a current is passing through the solenoid thereby holding the core, and the rod affixed thereto, in this position. The current for this holding operation is obtained from conductors 22 and 15 through conductors 24 and 26 respectively, with the interposition of the thermostat 23. As long as the contact in thermostat 23 is operable to close the circuit flowing therethrough, the solenoid will, after the rod and core have been pressed to inner position manually, hold this inner position and accordingly permit a current flow through the conductors 12 and 13 to thereby charge the battery. If, however, the switch in thermostat 23 is actuated to open position upon too high a temperature, then the current flow to the holding contactor assembly 14 will be cut off and thereby actuated to break conductor 13 whereby no current flow to the battery is possible. This holding contactor assembly after such breaking must be manually re-set.

A load resistor circuit is adapted to be applied to the terminals of the battery in combination with a meter circuit and meter and connected into the conductors 15 and 22. A load resistor 27 is inserted in conductor 28 having one end thereof connected to conductor 22. The other end is connected to one terminal of a relay 29. From another terminal of the relay a conductor 30 extends and is connected to conductor 15. One lead 31 from the relay is connected into conductor 30 and the other lead from the relay is terminated in one contact 32 of a switch. The lead is shown at 33. The contact 32 will, as shown hereinafter, be seen as incorporated in a test prod generally designated at 34. Connected in parallel with the relay 29 by means of conductors 31' is an indicator lamp 35. The purpose of the lamp 35 is to indicate when the relay is closed.

The test prod 34 incorporates battery terminal prods 36 adapted for contacting with the terminals of battery cells. These prods 36 are connected by means of leads 37 to a test meter generally shown at 38. A switch 39 is also built into the prod 34 and the contact 32 is one of the terminals thereof. The switch 39 is adapted, upon pressing the prods 36 on the terminals of a cell, to be closed and thereby closing the circuit to the relay 29 through the conductor 33 and conductor 40 connected to conductor 22.

The meter 38 can be of a type shown in Patent No. 2,431,992 in which a zero adjustment is provided for the indicator needle to give different ranges for different types of batteries such as 6 or 12 volt batteries. The meter can also be of a type shown in Patent No. 2,295,578 where there is a rheostat in series with the circuit which requires more voltage with greater capacity batteries to give the same deflection of the needle within a given range. The structural details of the meters will be apparent from a study of these prior patents and need not be recited herein.

In this embodiment of the invention only a single load resistor 27 is used and accordingly this circuit is adapted for use with either a 6 or 12 volt battery. The resistor 27 can, of course, be changed so that the meter can be adapted for use either on a 6 volt or a 12 volt battery.

It will be seen that when the prod 34 is applied to the terminals of a cell, there is made a voltage connection across the cell. The switch 39 will be closed when the prod is depressed thus energizing the relay 29 in series with the load resistor 27 to apply a load to the battery. The voltmeter 38 will then read the cell voltage under load.

In the embodiment shown in Figure 2, the circuit is basically the same as that shown in Figure 1. There is, however, a manually operable switch 41 interposed in conductor 33 and a second load resistor 42 connected into conductor 28 and a second relay 43 having one of its terminals connected by lead 44 to switch 41. When the switch is manually actuated so that contact is made with terminal 45, then relay 43 is actuated to place load resistors 27 and 42 in series. When in this position, the unit is adapted for testing of a 12 volt battery.

When the switch 41 is actuated so as to contact with terminal 46, relay 29 is actuated and only load resistor 27 is applied to the battery. In this condition, the circuit is adapted for testing of a 6 volt battery. It will be seen that in this embodiment, a selective load resistor combination is provided where the value of the resistance for a 6 volt battery is different from that of a 12 volt battery and the selection is made manually by the operator by means of the switch 41.

Figure 3:
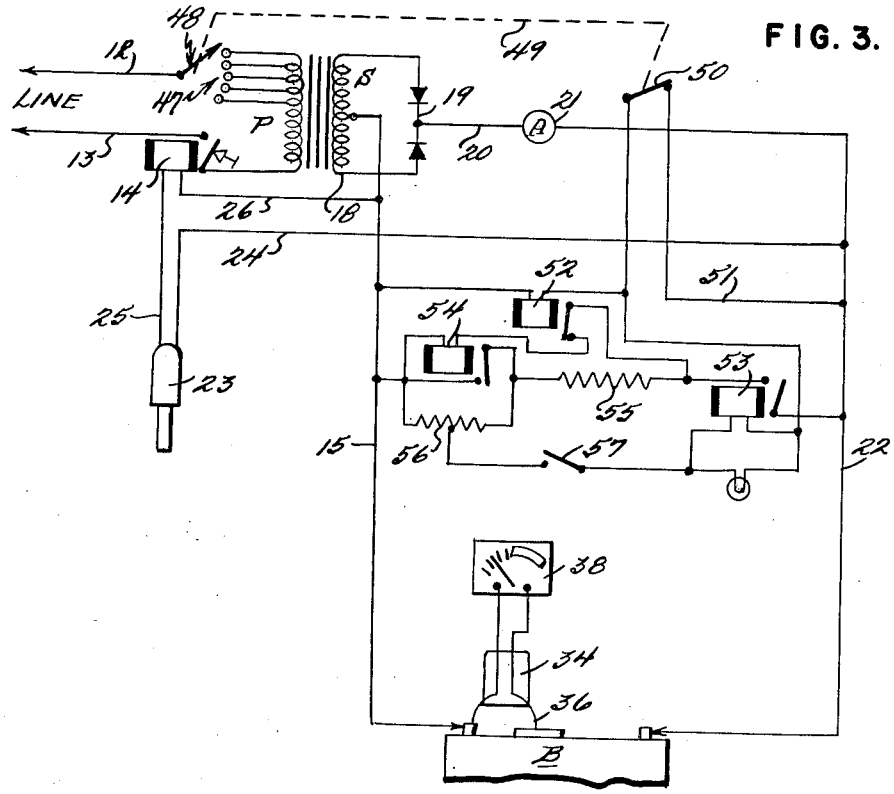
Figure 3 is another view similar to that of Figure 1 illustrating a still further modified form of circuit incorporating a battery voltage sensing relay for automatically varying the battery test load and utilizing a separate and distinct meter circuit.

In the embodiment shown in Figure 3, the primary windings P of the transformer are tapped at a plurality of points indicated at 47 and a control switch 48 is utilized in conductor 12 for connecting with the various taps 47. This provides a control switch to vary the charging rate of the battery as will be apparent. Interconnected with the control switch 48 by mechanical means, broadly shown at 49, is a switch 50 connected into conductor 51 which is connected between conductors 15 and 22. Switch 50, when the battery is being charged and the switch 48 is in any contacting position with the taps 47, through means 49, will be opened and accordingly no load can be applied on the battery. At the same time it will be seen that when the switch 50 is closed so that a load can be applied to the battery, the switch 48 will be in open position and no charge can be applied to the battery.

A normally closed sensing relay 52 is connected into conductor 51 and this sensing relay responds to the overall voltage of the battery to select a proper load to be applied thereto. The sensing relay is energized by 12 volts to open its contacts to allow relay 54 to open for placing of resistances or load resistors 55, 56 in series for testing of a 12 volt battery. The sensing relay 52 will, when the circuit is applied to a 6 volt battery, close its contacts to cause the selective relay 54 to close and short circuit resistance 56 and accordingly a single resistor 55 will be applied as a load. The sensing relay is so arranged as to open at 10 volts and then resistors 55 and 56 are applied as a load by placing the resistor 55 in series with resistor 56.

Also in this embodiment there is a manually operable switch 57 which actuates relay 53 to connect the load to a battery.

In the embodiment of Figure 3, the test prod 34 and volt test meter 38 are not connected into the circuit, but are separably operable as can be seen from the drawing.

The circuit shown in Figure 4 is similar to that disclosed in Figure 3 with the exception that a combination prod 34 is utilized which has a contactor switch 58 which replaces the manually operated switch 57 of the form of Figure 3. When the prod 34 is depressed, the contactor switch 58 is closed and accordingly the load of the resistors 55 or 55 and 56 in series are applied to the battery in accordance with the condition of sensing relay 52 as defined in connection with Fig. 3. When the switch 58 is closed, relay 53 in series with the load will be energized as shown and accordingly the operation will be the same as set forth in Figure 3 when switch 57 is closed.

The circuit set forth in Figure 5 performs in a manner similar to that shown in Figure 2. In this instance, however, the meter 38 and the prod 34 are not connected into the load circuit. The relay 29 of Figure 2 is replaced by a push-button switch 59 and the relay 43 of Figure 2 is replaced by a push-button switch 60. When the switch 59 is in closed position, the resistor load 27 will be applied to the battery. When the switch 60 is closed, then the resistor load 42 is placed in series with resistor load 27 and the test device is then adapted for use with a 12 volt battery. When only the switch 59 is closed, then the test circuit is adapted for use with a 6 volt battery.

In the partial circuit shown in Figure 6, the arrangement of the relays 29 and 43 and the load resistors 27 and 42 are similar to that shown in Figures 2 and 5. In this embodiment, however, a manually operable switch 61 is utilized for energizing either the relay 29 through terminal 62 or relay 43 through terminal 63. When the switch 61 is connected through terminal 62, then the single load resistor 27 will be applied to a 6 volt battery. When the switch 61 is connected through terminal 63, the relay 43 will be actuated, thereby placing the load resistors 42 and 27 in series for applying the load to a 12 volt battery.

The partial circuit shown in Figure 7 is similar to that set forth in Figure 5, but in this instance, the selective switches 59 and 60 are replaced by terminal posts 64 and 65 and a jumper connection shown at 66 is connected into conductor 15. When the jumper connection 66 is in contact with terminal post 64, the load resistor 27 will be applied to a 6 volt battery. When, however, the jumper connection 66 is connected with terminal post 65, the load resistor 42 will be placed in series with load resistor 27 and the load can be applied to a 12 volt battery.

The meter circuit shown in Figure 8 is similar to that shown in Figure 2, but in this instance, a switch such as 39 of Figure 2 is not utilized in the prod. This is replaced by an initiator relay 67 which is connected across the prod as shown. The manner in which this operates is to normally hold the relay 67 open so that no load is applied to the battery. When the prod 34 is placed on the cell terminals, however, the initiator relay 67 will derive voltage from the cell under test, thereby closing the relay and activating either load resistor 27, or load resistors 27 and 42 in series, in the circuit, dependent upon the position of the switch 41, and applying the load on the battery.

Figure 9 discloses a test meter circuit and load circuit similar to that shown in Figure 4. In this embodiment, however, the switch 58, in the prod of Figure 4, is eliminated and replaced by a relay 68 which is connected across the prod 34. When the prod 34 has its prod legs 36 applied across the terminals of a cell, the relay 68 will derive voltage from the cell and upon being energized thereby will selectively actuate the circuit of relay 54 depending upon the condition of sensing relay 52 as defined in connection with Figs. 3 and 4 so as to apply either the resistor 55 to a 6 volt battery, or to apply the load resistors 55 and 56 in series to a 12 volt battery. The remainder of this embodiment is the same as that shown in Figure 4 and operates otherwise in the same manner.

We claim:

1. In an electrical tester of a load type for 6 and 12 volt automotive storage batteries and the like, a load circuit, selective load means in said load circuit for applying selected loads to a 6 or 12 volt battery to be tested, a meter circuit, a volt meter in said meter circuit to read cell voltage of a battery under load, means of making voltage connection across a battery cell while said load means is applied to a battery, and voltage sensitive means operable by the battery voltage for selectively and automatically activating the proper load means in said load circuit for a 6 or 12 volt battery.

2. In a tester as claimed in claim 1, a battery charging circuit, a thermostat in said charging circuit operable at a preselected battery electrolyte temperature to terminate charging and establish a specific electrolyte temperature so that testing will be accurate.

3. In an electrical tester as claimed in claim 1, adjustment means to compensate the voltage reading for different sizes of batteries.

4. In an electrical tester as claimed in claim 3, said adjustment means comprising a meter zero adjustor.

5. In an electrical tester as claimed in claim 1, means for adjusting the meter circuit to compensate the voltage reading for different sizes of batteries.

6. In an electrical tester as claimed in claim 1, means for adjusting the load circuit to compensate the voltage reading for different sizes of batteries.

7. An electrical tester as claimed in claim 1, wherein said load means comprises a selective load resistor to correspond to the different value of the resistance for a six volt battery and a twelve volt battery.

8. In an electrical tester as claimed in claim 7, means for selecting the load resistance comprising a voltage sensitive relay which responds to the overall voltage of the battery to automatically select the proper load.

9. In an electrical tester as claimed in claim 8, means for automatically disconnecting said voltage sensitive relay and said load circuit during charging of a battery.

10. In an electrical tester as claimed in claim 1, wherein a selective load resistor is used where the value of the resistance for a six volt battery is different from that for a twelve volt battery, means for selecting the load resistance comprising a voltage sensitive relay which responds to the overall voltage of the battery to automatically select the proper load, a prod for making voltage connection across a battery cell, a switch in said prod closable on depressing the prod, said switch energizing said relay when closed.

11. In an electrical tester as claimed in claim 10, a switch operable to connect the load resistor to the battery and means to automatically disconnect the voltage sensitive relay and load circuit while charging a battery.

12. In an electrical tester as claimed in claim 11, a relay connected across said prod and energizable by cell voltage to actuate a relay for closing the load circuit and connecting the load resistance to said battery.

References Cited in the file of this patent

UNITED STATES PATENTS

| | | |
|---|---|---|
| Re. 22,883 | Heyer | May 27, 1947 |
| 1,382,622 | Bryce | June 28, 1921 |
| 2,229,009 | Berry | Jan. 14, 1941 |
| 2,270,554 | Pugh | Jan. 20, 1942 |
| 2,295,578 | Heyer | Sept. 15, 1942 |
| 2,310,514 | Callender | Feb. 9, 1943 |
| 2,347,452 | Amsden | Apr. 25, 1944 |
| 2,354,877 | Peters | Aug. 1, 1944 |
| 2,355,488 | Van Vulpen et al. | Aug. 8, 1944 |
| 2,366,505 | Fletcher | Jan. 2, 1945 |
| 2,413,865 | Dalzell | Jan. 7, 1947 |
| 2,431,945 | Little et al. | Dec. 2, 1947 |
| 2,431,992 | Dalzell | Dec. 2, 1947 |
| 2,432,069 | Pugh | Dec. 2, 1947 |
| 2,436,057 | Pugh | Feb. 17, 1948 |
| 2,456,978 | Medlar | Dec. 21, 1948 |
| 2,499,663 | Medlar | Mar. 7, 1950 |
| 2,529,038 | Medlar et al. | Nov. 7, 1950 |
| 2,563,234 | Godshalk et al. | Aug. 7, 1951 |
| 2,585,005 | Godshalk et al. | Feb. 12, 1952 |
| 2,675,522 | Godshalk | Apr. 13, 1954 |